(12) United States Patent
Diez-Ochoa Diez

(10) Patent No.: US 12,164,176 B2
(45) Date of Patent: Dec. 10, 2024

(54) LASER ASSISTED AUTOFOCUS

(71) Applicant: Leica Instruments (Singapore) Pte. Ltd., Singapore (SG)

(72) Inventor: Miguel Diez-Ochoa Diez, Heerbrugg (CH)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 254 days.

(21) Appl. No.: 17/663,026

(22) Filed: May 12, 2022

(65) Prior Publication Data

US 2022/0373767 A1     Nov. 24, 2022

(30) Foreign Application Priority Data

May 18, 2021 (EP) .................................... 21174433

(51) Int. Cl.
| | | |
|---|---|---|
| *G02B 7/34* | (2021.01) | |
| *G02B 21/00* | (2006.01) | |
| *G02B 21/24* | (2006.01) | |

(52) U.S. Cl.
CPC ........... *G02B 7/34* (2013.01); *G02B 21/0012* (2013.01); *G02B 21/245* (2013.01)

(58) Field of Classification Search
CPC .... G02B 7/34; G02B 21/0012; G02B 21/245; G02B 7/32; G02B 21/241
See application file for complete search history.

(56) References Cited

U.S. PATENT DOCUMENTS

| | | | | |
|---|---|---|---|---|
| 4,844,617 | A * | 7/1989 | Kelderman | G01J 3/02 |
| | | | | 250/201.3 |
| 6,504,608 | B2 * | 1/2003 | Hallmeyer | G03F 9/7034 |
| | | | | 356/369 |
| 7,468,834 | B2 * | 12/2008 | Wolleschensky | G01N 21/6458 |
| | | | | 359/385 |
| 7,488,070 | B2 * | 2/2009 | Hauger | G01J 9/00 |
| | | | | 351/200 |
| 7,623,907 | B2 * | 11/2009 | Takaoka | A61B 5/0084 |
| | | | | 600/475 |
| 9,297,994 | B2 * | 3/2016 | Perlitz | G02B 21/245 |
| 9,488,820 | B2 * | 11/2016 | Cable | G02B 21/06 |
| 10,278,566 | B2 * | 5/2019 | Okazaki | H04N 23/673 |
| 10,331,930 | B2 * | 6/2019 | Desvernay | G06K 7/1439 |
| 10,705,326 | B2 * | 7/2020 | Small | G02B 21/36 |
| 11,815,458 | B2 * | 11/2023 | Prince | G02B 7/32 |
| 2001/0010592 | A1 * | 8/2001 | Nakamura | G02B 21/22 |
| | | | | 359/368 |

(Continued)

FOREIGN PATENT DOCUMENTS

| | | | | | |
|---|---|---|---|---|---|
| CN | 102124392 | A | * | 7/2011 | ............... G02B 7/34 |
| CN | 113167691 | A | * | 7/2021 | ............... G01N 1/04 |

(Continued)

*Primary Examiner* — Mohamed K Amara
(74) *Attorney, Agent, or Firm* — 2SPL Patent Attorneys PartG mbB; Yong Beom Hwang

(57) ABSTRACT

An autofocus device is disclosed, including a focusing lens which is movable. A laser beam passes through the focusing lens toward a focal plane; and a detector collects laser scatter from a nonfocal position outside of the focal plane. The device determines, from the collected laser scatter, the nonfocal position of the scattering source, and moves the focusing lens, based on the determined nonfocal position, such that the scattering source is at an origin of the focal plane.

11 Claims, 5 Drawing Sheets

(56) References Cited

U.S. PATENT DOCUMENTS

2009/0213362 A1    8/2009  Nakamura et al.
2020/0363616 A1*  11/2020  Jarvius ................. G02B 21/002

FOREIGN PATENT DOCUMENTS

| EP | 2881701 A1 | | 6/2015 | |
|----|------------|---|--------|---|
| JP | 2022533001 A | * | 7/2022 | ............. G02B 21/00 |
| WO | 03060589 A1 | | 7/2003 | |

* cited by examiner

LASER ASSISTED AUTOFOCUS

TECHNICAL FIELD

Examples disclosed herein relate to an autofocus device and a surgical microscope including an autofocus device.

BACKGROUND

Automatic focusing of an image can be relied upon to provide sharp images. Delays in settling of autofocus or incorrect focus can be troublesome, as well as inaccurate autofocus determinations, particularly in surgical microscopy.

SUMMARY

It may be desirable to improve the autofocus capabilities of imaging devices particularly surgical microscopes. An autofocus device, a surgical microscope, and related methods of use are disclosed herein to address issues, such as enabling rapid and accurate autofocusing.

An autofocus device is disclosed, including a focusing lens which is movable; a laser beam which is configured to pass through the focusing lens toward a focal plane; and a detector configured to collect laser scatter from a nonfocal position outside of the focal plane. The device is configured to determine, from the collected laser scatter, the nonfocal position of the scattering source, and the device is configured to move the focusing lens, based on the determined nonfocal position, such that the scattering source is at an origin of the focal plane. The autofocus device can aid in rapid and robust focus adjustments.

The autofocus device can determine the nonfocal position by determining the distance of the scattering source, in a nonfocal plane parallel to the focal plane, from an optical axis which passes through the nonfocal plane and the focal plane. The autofocus device can aid in rapid and robust focus adjustments.

The autofocus device can move the focusing lens by a z-distance determined based on the origin of the focal plane and the nonfocal position of the scattering source. The autofocus device can aid in rapid and robust focus adjustments.

The autofocus device can include a second laser beam which is configured to pass through the focusing lens toward the focal plane. The second laser beam can increase accuracy and speed of the autofocus adjustments. The first and second laser beams can be directed at the origin of the focal plane. The beams can aid in sensitively detecting an object that is out of focus image.

The autofocus device can collect first laser scatter from the first laser beam from a first nonfocal position outside of the focal plane, and collect second laser scatter from a second nonfocal position outside of the focal plane. The device can determine, from the collected first and second laser scatter, the first and second nonfocal positions of the scattering source. The first and second determination for the first and second laser scatter can improve speed and accuracy of the focus determination.

The autofocus device can determine a distance, in a nonfocal plane parallel to the focal plane, of the first nonfocal position to the second nonfocal position. Such a determination can aid in accurately determining the extent of defocus and/or may aid in accurately determining the autofocus.

The autofocus device can move the focusing lens such that the second laser scatter is at the origin of the focal plane. Such movement can provide for accurate focusing.

The autofocus device can move the focusing lens by a z-distance, based on the origin of the focal plane, and the first and second nonfocal positions, such that the scattering source is at the focal plane. Such movement can provide for accurate focusing.

The autofocus device can include a controller communicatively coupled to the detector and an actuator for moving the focusing lens. The detector can be an array detector. The array detector and controller can aid in providing fast and accurate focusing.

The autofocus device can have the origin at a focal point of at least one of the autofocus device or a microscope which is coupled to the autofocus device. Placement of the origin at the focal point can aid in providing accurate focusing.

The autofocus device can determine a change of the nonfocal position of the scattering source when the focusing lens is moved, and to adjust the movement of the focusing lens based on the determined change. The ability to adjust movement of the focusing lens can aid in accurate and quick autofocus.

A surgical microscope that includes the autofocus device as described herein is disclosed. A surgical microscope can particularly benefit from fast and accurate autofocus capability. The surgical microscope can have the laser beam converge at the focal plane at the working distance of the microscope. The beam converging at the focal plane at the working distance can aid in accurate and quick autofocus.

A method of focusing a focusing lens is disclosed, comprising: passing a laser beam through a focusing lens, directing the laser beam at a focal plane; collecting laser scatter from a nonfocal position outside of the focal plane by a detector; determining a nonfocal position of the scattering source from the collected laser scatter; and moving the focusing lens based on the determined nonfocal position, such that the scattering source is at an origin of the focal plane. The nonfocal position determination and lens movement based thereupon can aid in fast and accurate autofocus.

A computer program comprising instructions to focus a lens according to the methods described herein is disclosed.

SHORT DESCRIPTION OF THE FIGURES

Some examples of apparatuses and/or methods will be described in the following by way of example, and with reference to the accompanying figures, in which.

DETAILED DESCRIPTION

Various examples will now be described more fully with reference to the accompanying drawings in which some examples are illustrated. In the figures, which are not to be assumed to be to scale, the thicknesses of lines, layers and/or regions may be exaggerated for clarity.

As used herein, the term "and/or" includes any and all combinations of one or more of the associated listed items and may be abbreviated as "/". Herein, a trailing "(s)" indicates one or more; for example processor(s) indicates one or more processors.

Herein, some aspects and/or technical features are described in the context of an apparatus. Technical features described in the context of the apparatus are also understood to describe a corresponding method, for example. Herein are disclosed methods of operating the apparatus, operating a surgical microscope, and operating a surgical device, for example. Aspects, steps, and/or technical features described in the context of a method also describe a corresponding technical feature of a corresponding apparatus. For example, determinations, as may be described with respect to a method and/or function, may be done by processor(s) of an apparatus. An apparatus described herein as performing a function or step within a method is a disclosure of performing the function and/or method as well.

Figure 1A:
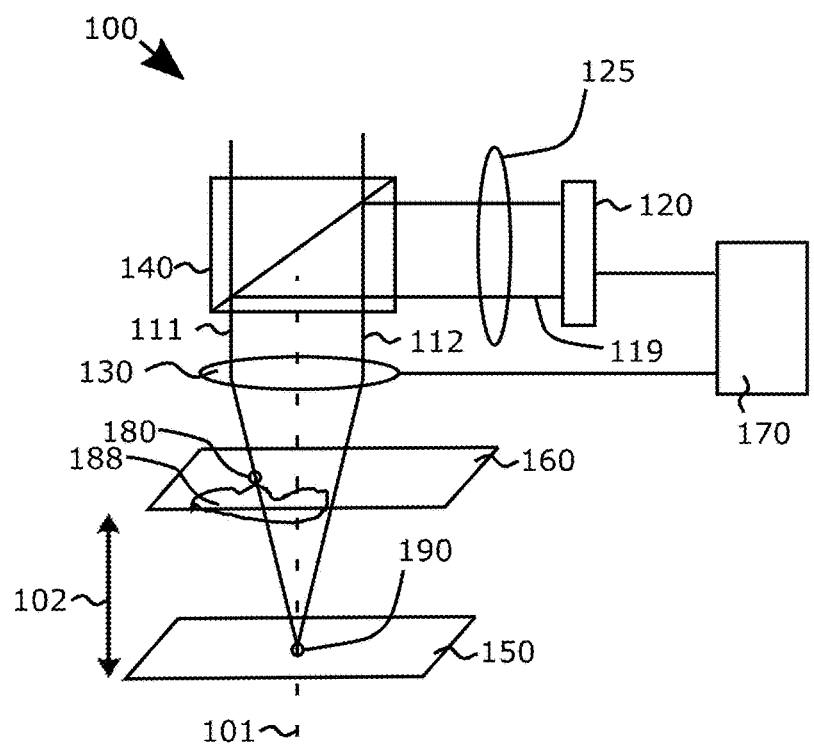
FIGS. 1A and 1B illustrate an autofocus device, according to embodiments described herein.

FIG. 1A illustrates an autofocus device, according to an embodiment. The autofocus device 100 includes a focusing lens 130 which can be movable. An optical axis 101 of the device 100 is shown, the axis 101 passing perpendicularly through a nonfocal plane 160 toward a focal plane 150. In FIG. 1A, the nonfocal plane 160 is depicted above the focal plane 150. Alternatively/additionally, a nonfocal plane 160 can be below the focal plane 150.

At least one laser beam 111, 112 passes through the focusing lens 130 toward the focal plane 150. Introduction of the laser beams 111, 112 can be aided with an optional beamsplitter 140. Alternatively/additionally, the laser module(s) that produce the beams can be above the lens 130. A detector 120 can collect laser scatter from a nonfocal position 180 outside of the focal plane 150, such as collected laser scatter 119 from a scattering source 188 (e.g a sample or object of interest which scatters the laser beam(s) 111, 112). Detector optics 125 can detect the collected laser scatter 119 to the detector 120.

The device 100 can determine the nonfocal position 180 of the scattering source 188 from the collected laser scatter 119, e.g. by operation of a controller 170 such as a processor communicatively coupled to the detector 120. The detector 120 can collect light and convert light into a signal, which may include signal(s) from laser scatter.

The collected laser scatter 119 may be out of focus on the detector 120. The detector 120, which may be an array detector may allow for the determination of the center and/or edge of the collected laser scatter 119. For example, the scattered beam(s) may appear at the detector as a bright spot. The device may detect the position by determining the center and/or edge of the spots on the detector.

Figure 1B:
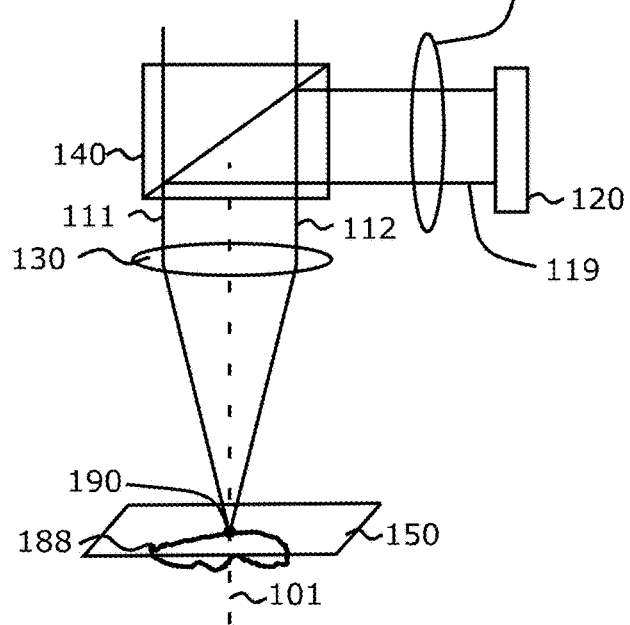

The device 100 can move the focusing lens 130 based on the determined nonfocal position 180. Particularly, the device 100 can move the focusing lens 130 and/or the sample stage such that the scattering source 188 is at an origin 190 of the focal plane 150, as depicted in FIG. 1B. The origin 190 can be a focal point of the autofocus device 100 and/or a microscope which is coupled to the autofocus device.

The movement of the lens 130 may be controlled by the controller 170, which may be communicatively coupled thereto. Positioning the scattering source 188 at the focal plane 150, e.g by movement of the lens 130, can focus the image of the scattering source 188. The origin 190 can be where the laser beam 111, and possibly more laser beam(s) such as a second laser beam 112 as depicted in FIG. 1A is focused, e.g. on the optical axis 101.

Returning to FIG. 1A, the device 100 can determine from the collected laser scatter 119, a nonfocal position 180 of the scattering source 188. The device 100, such as the controller 170 thereof, can determine the nonfocal position 180. For example, the device 100 can determine the nonfocal position 180 by determining the distance of the scattering source 188, in the nonfocal plane 160, from the optical axis 101.

Figure 2A:
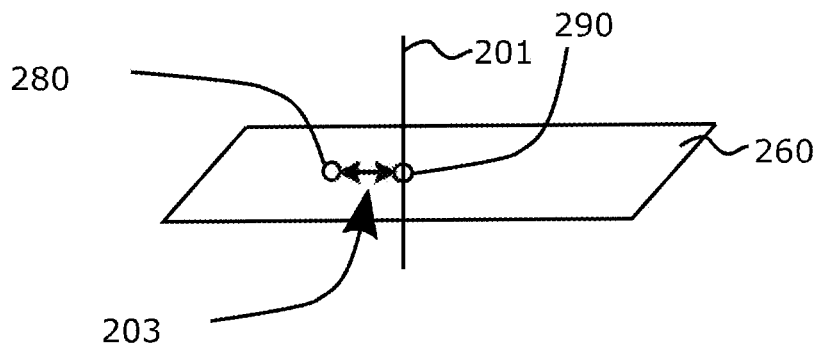
FIG. 2A illustrates a nonfocal plane, according to embodiments described herein.

FIG. 2A illustrates a nonfocal plane, according to an embodiment. FIG. 2A may be illustrative of FIG. 1A, e.g. when a scattering source 188 is at a nonfocal position 280 in a nonfocal plane 260. The distance 203, in the nonfocal plane 260, between the nonfocal position 280 of the scattering source 188 and the optical axis 201 (e.g. at point 290 where the optical axis 201 intersects the nonfocal plane 260) can be determined by the device 100, e.g. by the detector 120 and/or a controller 170 communicatively coupled thereto. The nonfocal position 280, as determined by the device 100, can include a distance, e.g. the distance between the optical axis 201 and the position of collected laser scatter 119. The nonfocal position 280 may also include additional parameters such as angular position.

Alternatively/additionally, the distance 203 determined by the device 100 can be a distance 203 in the plane at the detector 120. For example, the distance 203 is determined as the distance between the optical axis 101 and the collected laser scatter 119 at the detector 120. The device 100 can be calibrated such that the position of detection at the detector 120 can be used to determine the position in the nonfocal/focal planes 150, 160. Positions may be relative, e.g position with respect to the optical axis 101.

Figure 2B:
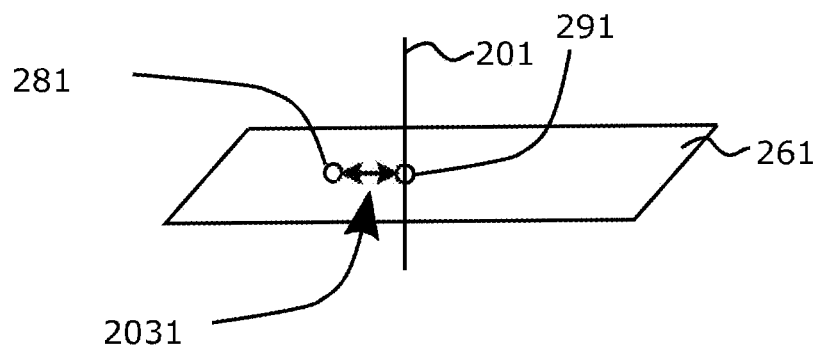
FIG. 2B illustrates a detector plane, according to embodiments described herein.

FIG. 2B illustrates a detector plane, according to an embodiment. The detector plane 261 can be configured to collect laser scatter from a nonfocal plane 260. The distance 2031 in the detector plane 261 between the nonfocal position 281 of the collected laser scatter 119 and the optical axis 201 (e.g. the point 291 where the axis 201 intersects the nonfocal and/or detector plane 261) can be determined by the device 100. For example, the distance 2031 in the detector plane 261 is proportional to the distance 203 at the nonfocal plane 260. the proportionality may be known, e.g. through calibration. The device 100 may determine the nonfocal position 280 by determining the distance 203, 2031 of the scattering source 188 and/or collected laser scatter 119, in the nonfocal plane 260 and/or the detector plane 261, from the optical axis 201.

For example, in the case when the laser beam 111 is configured to focus at the origin 190 of the focal plane 150 (e.g the intersection of the focal plane 150 and the optical axis 101), the distance of the scattering source 188, in the nonfocal plane 160, to the optical axis 101 can be determined.

FIG. 1A shows a z-distance 102, which may be a distance between the nonfocal plane 160 and the focal plane 150. The z-distance may also include a direction, e.g. the direction up or down. The z-distance 102 may be alternatively/additionally the distance for moving the lens 130 which would effectively move the focal plane to the nonfocal plane 160, e.g. to the position of the scattering source 188 at the nonfocal plane 160. Referring again to FIGS. 2A and 2B, the distance 203 and/or 2031, in the nonfocal plane 160, 260, 261 (detector plane), between the optical axis 101, 201 and the nonfocal position 280, 281 can be used to determine the z-distance 102.

For example, the scattering source 188 can be brought into focus by moving the lens 130 by the z-distance 102. The position of the nonfocal position 180 relative to the optical axis 101 can be used to determine the z-distance 102. The z-distance 102 can be determined based on the optical axis 101, the origin 190 of the focal plane 150 (e.g. a point on the optical axis), and/or the origin 190 projected onto the nonfocal plane 160 (e.g. a point on the optical axis), and the nonfocal position 180 of the scattering source 188 (e.g. the nonfocal position 180 on the nonfocal plane 160). Referring also to FIGS. 2A and 2B, the z-distance 102 can be determined based on the distance 203 and/or distance 2031.

Alternatively/additionally, the determination of the z-distance 102 can include being based on the position of the laser beam 111 at a reference plane (e.g. a plane at or above the lens 130), the lens power/focal length, and/or the angle at which the laser beam 111 intersects the optical axis 101.

The device 100 can be configured to move the focusing lens 130 such that the collected laser scatter 119 is at the origin 190 of the focal plane 150. The detector 120 can be configured to detect a distance 203, 2031 of the collected laser scatter 119 from the optical axis 201, such as to determine the z-distance 102. The device 100 can move the focusing lens 130 the z-distance 102 based on the distance 203, 2031 such that the scattering source 188 is in focus.

Referring to FIGS. 2A and 2B, the movement of the focusing lens 130 and/or the determination of the z-distance 102 can be alternatively/additionally based on a vector determined from a reference point and the nonfocal position(s) 280, 281. The reference point can be the intersection of the optical axis 101 with the nonfocal plane 260 and/or detector plane 261.

Figure 3:
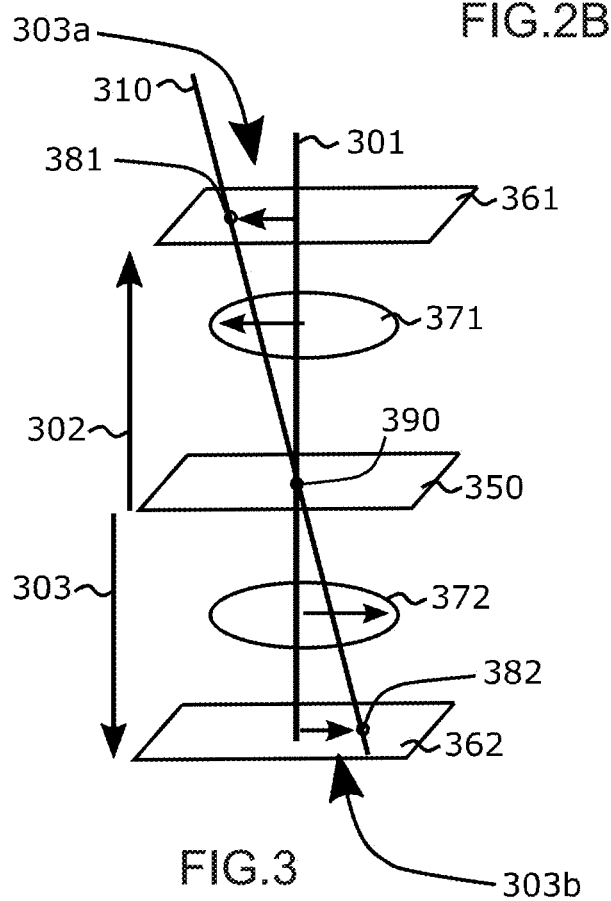
FIG. 3 illustrates a focal plane and nonfocal planes, according to embodiments described herein.

FIG. 3 illustrates a focal plane and nonfocal planes, according to an embodiment. FIG. 3 illustrates a focal point and/or origin 390 at a focal plane 350, a first nonfocal plane 361 located above the focal plane 350, and a second nonfocal plane 362 below the focal plane 350. A laser beam 310 is directed at the focal plane 350.

The laser beam 310 can intersect the first nonfocal plane 361 at a first intersection point which can be the first nonfocal position 381, which may be a point of an out-of-focus scattering source. A first distance 303a is shown on the first nonfocal plane 361, between the first intersection point 381 and the optical axis 301.

"Intersection point" and "nonfocal position" may be used interchangeably. The point where a laser beam is scattered from a scattering object may be referred to as a nonfocal position. The same point in space (assuming the same optical configuration of the device 100), when the scattering object is not present, may be referred to as an intersection point, e.g. where the laser beam intersects the nonfocal plane and would be scattered if a scattering source were present at the intersection point.

The laser beam 310 can intersect the second nonfocal plane 362 at a second intersection point and/or second nonfocal position 382, which may be a point of an out-of-focus scattering source. A second distance 303b is shown on the second nonfocal plane 362, between the first intersection point 382 and the optical axis 301.

FIG. 3 illustrates a case where the distances 303a, 303b can be equal. For example, the distance 303a that is determined for a scattering source 188 at the first intersection point 381 and/or nonfocal position 381 is the same distance 303b determined for a scattering source 188 at the second intersection point and/or second nonfocal point 382 (distances 303a, 303b being equal). When the distance 303a, 303b is determined, there are two possible solutions for the position of the focal plane. This is referred to herein as a degeneracy problem.

The degeneracy problem can be dealt with in one or more ways. For example, the determination of the nonfocal plane that includes the scattering source 188 can be determined from the relative positions of the optical axis 301, or origin 390 (or the origin projected onto the nonfocal planes 361, 362 along the axis 301) and the nonfocal position 381, 382. If the nonfocal position 361 is to the left of the optical axis 301, then the nonfocal position 361 is in the first nonfocal plane 361. If the nonfocal position 362 is to the right of the optical axis 301, then the nonfocal position 362 is in the second nonfocal plane 362.

The device 100 may determine a difference. For example, a difference can be determined based on taking the difference of the (i) position of the origin projected onto the nonfocal planes 361, 362 along the axis 301 and (ii) the position of the detected scatter (e.g. the relevant nonfocal position 381, 382). The difference can be positive or negative along a direction coplaner with the focal plane 350 and passing through the positions 381, 382 projected onto the focal plane 350. The sign of the difference can indicate the nonfocal plane 361, 362.

In a case where the distance 303a or 303b is determined, the autofocus device 100 may move the focusing lens 130 (or the sample stage) the z-distance in either direction. If a direction is selected, and movement of the lens begins, the image will focus or further defocus. As the focus improves or becomes worse, the controller 120 may actuate further lens movement in the same direction to the focus position, or may actuate a reversal of the lens movement, as appropriate. The controller 120 can determine lens movement based on the subsequent detection of collected laser scatter 119. For example, if the determined distance 303a, 303b increases after movement of the lens 130, then the movement is reversed.

For example, if the scattering source 188 is at the first nonfocal plane 361, and the lens is moved down, the nonfocal position 381 moves farther from the optical axis 301. In such a case, the lens movement can be reversed. Movement of the lens upward causes the distance 303a to decrease until the focal plane 350 is coplanar with the scattering source 188, e.g. the scattering source is at the origin 390 of the focal plane 350.

In another example, if the scattering source 188 is at the second nonfocal plane 362, and the lens is moved down, the nonfocal position 382 moves closer to the optical axis 301. In such a case, the lens movement can be continued. Movement of the lens downward causes the distance 303b to decrease until the focal plane 350 is coplanar with the scattering source 188, e.g. the scattering source is at the origin 390 of the focal plane 350.

In another example, if the scattering source 188 is at the first nonfocal plane 361, and the lens is moved up, the nonfocal position 381 moves closer to the optical axis 301. Movement of the lens upward causes the distance 303a to decrease until the focal plane 350 is coplanar with the scattering source 188, e.g the scattering source is at the origin 390 of the focal plane 350.

For example, if the scattering source 188 is at the second nonfocal plane 362, and the lens is moved up, the nonfocal position 382 moves farther from the optical axis 301. In such a case, the lens movement can be reversed. Movement of the lens down causes the distance 303b to decrease until the focal plane 350 is coplanar with the scattering source 188, e.g. the scattering source is at the origin 390 of the focal plane 350.

Arrows 302, 303, shown in FIG. 3, are each equally proportional to the distance 303a, 303b. Arrows 302, 303 may be regarded as z-distances which may include direction information, such as a sign (positive or negative, and/or a digital bit 0 or 1), and/or a direction component. The lens 120 can be moved by a z-distance corresponding to the z-distance given by the arrows 302, 303 such that the focal plane 350 is moved to either of the nonfocal planes 361, 362. Each nonfocal position 381, 382 may have the same absolute distance 303a, 303b, in the respective nonfocal planes 361, 362, from the optical axis 301. The problem of degenerate distances 303a, 303b in determining the movement of the focusing lens 130, and/or z-direction, can be addressed by determining if the distance 303a, 303b increases or decreases as the lens 130 is moved, and reversing the lens movement as necessary (e.g. so that the determined distance 303a, 303b decreases until focus is reached).

The autofocus device 100 can determine a change of the nonfocal position 381, 382 of the scattering source 188 when the focusing lens 130 is moved. The device 100 can adjust the movement of the focusing lens 130 based on the determined change. For example, it is possible to reverse the movement of the lens. Alternatively/additionally, it is possible to speed up the movement of the lens 130 if the previous direction of movement is confirmed to be toward sharper focus (e.g. the distance 303a, 303b decreases).

Alternatively/additionally, the position of the collected laser scatter 119, e.g. within the nonfocal plane 160, 361, 362 can be determined relative to the optical axis 101, 301. The nonfocal position 381, as seen in FIG. 3, of a nonfocal plane 361 above the focal plane 350 is, within the nonfocal plane 361, on one side of the optical axis 301 (left side). The nonfocal position 382 of a nonfocal plane 362 below the focal plane 350 is on the opposite side of the optical axis 301 (right side).

For example, in addition to the distance 303a, 303b, the angular position 371, 372 of the collected laser scatter 119, and/or the collected laser scatter 119 position can be used to determine the nonfocal position 180, 381, 382 of the scattering source 188. The angular position 371, 372 can be an angle 0-360° in any plane perpendicular to the optical axis (e.g any focal or nonfocal plane perpendicular to the optical axis 101, 301). In the examples of FIG. 3, the angular position 371 of collected laser scatter 119 from the first nonfocal position 381 is 0°, and the angular position 372 of collected laser scatter 119 from the second nonfocal position 382 is 180°.

The angular position 371, 372 of the collected laser scatter 119 can be determined from the nonfocal position 381, 382. The angular position 371, 372 may be used to determine the direction to move the lens 130 that improves focus. The angular position 371, 372 may be information, such as a binary bit 0, 1, that can convey which side of optical axis (left or right in FIG. 3) the scattered light is detected from (e.g which of nonfocal positions 381, 382).

Alternatively/additionally, the movement of the focusing lens 130 and/or the determination of the z-distance 102 can be based on a vector determined from a reference point and the nonfocal position 380, 381 (e.g. the position of collected laser scatter 119 at the detector plane). The reference point can be the intersection of the optical axis 301 with the nonfocal plane 360, 361 and/or detector plane.

Returning to FIG. 1 for exemplary illustration, the device 100 can include a controller 170 which is communicatively coupled to the detector 120. The controller 170 can determine the nonfocal position 180, 280, 281, 381, 382 of the scattering source 188, e.g based on data received from the detector 120. The controller 170 can determine the z-distance 102. The controller 170 can also be communicatively coupled to the lens 130 and/or stage, for movement. The controller 170 can be communicatively coupled to an actuator for moving the focusing lens 130.

As illustrated in FIG. 1, the device 100 can include more than one laser beam 111, 112, such as first and second laser beams 111, 112. The detector 120 can collect laser scatter from more than one nonfocal position 180 outside of the focal plane 150. For example, first and second nonfocal positions can be determined from the collected laser scatter 119 which arises when first and second laser beams are scattered from a scattering source 188.

Figure 4A:
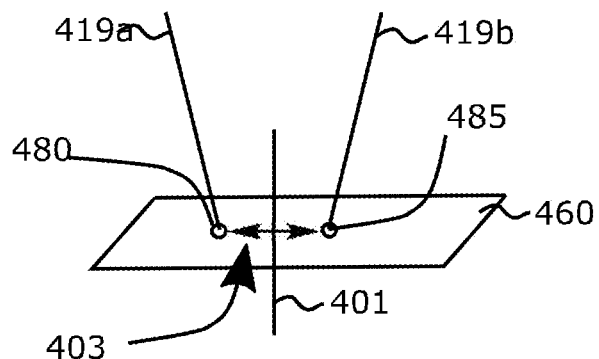
FIG. 4A illustrates a nonfocal plane, according to embodiments described herein.

FIG. 4A illustrates a nonfocal plane, according to an embodiment. FIG. 4A illustrates nonfocal plane 460. An optical axis 401 passes perpendicularly through the nonfocal plane 460. The first and second laser beams 111, 112 intersect the nonfocal plane 460 at first and second nonfocal positions 480, 485. The detector 120 can collect first laser scatter 419a from the first laser beam 111 and second laser scatter 491b from the second laser beam 112, e.g. from a scattering source 188 at the nonfocal plane 460. The device 100 can determine, from the collected laser scatter 491a, 491b (e.g. the first and second laser scatter 491a, 491b), the first nonfocal position 480 and the second nonfocal position 485 of the scattering source 188. The controller 170 may determine the nonfocal positions 480, 485.

Figure 4B:
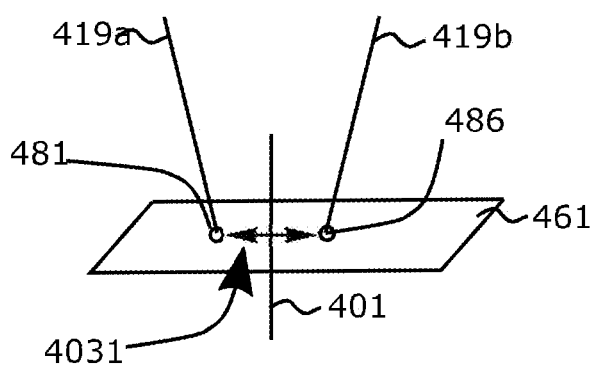
FIG. 4B illustrates a detector plane, according to embodiments described herein.

FIG. 4B illustrates a detector plane, according to an embodiment. The detector plane 461 can be configured to collect laser scatter from a nonfocal plane 460. The distance 4031 in the detector plane 461 between the first and second nonfocal positions 481, 486 from the laser scatter 419a, 419b can be determined by the device 100. For example, the distance 4031 in the detector plane 461 is proportional to the distance 403 at the nonfocal plane 460. The device 100 may determine relative nonfocal positions 481, 486 by determining the distance 403, 4031 of the collected laser scatter 419a, 419b, in the nonfocal plane 460 and/or the detector plane 461.

Alternatively/additionally, the nonfocal positions 480, 485, and or position from which laser scatter occurs, may not be coplanar in the object space. For example, the scattering source 188 may not be in a plane parallel to the focal plane 150 (see FIG. 1A). For example, the sample may have a slope, so that the sample is generally noncoplanar with the focal plane. In such as case, the autofocus device may operate with the assumption that the scattering source 188 and/or nonfocal positions 480, 485 is perpendicular to the optical axis. The device 100 may determine position 480, 485 as if the laser scatter arise from points of a nonfocal plane perpendicular to the optical axis.

Referring to FIG. 4A, the first laser scatter 419a and second laser scatter 419b can be assumed to be in a plane parallel to the focal plane 150. The first and second laser scattering points may come from positions of the scattering source 188 that may not be in a plane parallel to the focal plane, which is perpendicular to the optical axis 401. The determination of the distance 4031, can use the nonfocal positions 481, 486 at the detector plane 461. The nonfocal positions 481, 486, when they arise from laser scatter coming from positions that are noncoplanar to the nonfocal planes parallel to the focal plane, may be used for determining the distance 4031, 403, the z-distance 102, the magnitude to move the lens 130, and/or the direction to the move the lens, for example. The controller 170 may determine the distance 4031, 403, the z-distance 102, the magnitude to move the lens 130, and/or the direction to the move the lens using an algorithm that assumes the nonfocal positions 481, 486 are in a plane 460, 461 parallel to the focal plane 150.

The device 100 can move the focusing lens 130 such that the scattered laser light, e.g. the first laser scatter 419*a* and second laser scatter 419*b*, is at the origin 190 of the focal plane 150. The movement can be based on the distance 4031, the distance 403, and/or the z-distance 102. The origin 190 of the focal plane 150 (e.g. the focal point) can also be used to determine the movement of the lens. The power and/or focal length of the lens 130 can also be used to determine the movement of the lens. The angle the laser beams make with the optical axis can be used. A fixed first position of the first laser beam at a reference plane (e.g. the position of the first laser beam at the lens 130) may be used. A fixed second position of the second laser beam at the reference plane may be used. The working distance can be used.

The scattering source 188 can be uneven and/or sloped such that the collected laser scatter 119 comes from different nonfocal planes (e.g. planes that are each perpendicular to the optical axis 101, 401). The autofocus device 100 may determine a first distance (and direction information possibly) between the optical axis 401 and the first nonfocal position 480 and a second distance between the optical axis 401 and the second nonfocal position 485. The first and second distances can be averaged for determination of the z-distance 102 and/or lens movement. Alternatively/additionally, the z-distance 102 can be determined for each nonfocal position 480, 485 and the z-distance averaged. It is also possible to select one of the derivable z-distances from the nonfocal positions 480, 485.

Similarly as for the embodiments in which the distance 203 is determined relative to the optical axis, the problem of degenerate distances 403 can occur with two or more nonfocal positions 480, 485. A given determined distance 403, 4031 can arise from one of two nonfocal planes 361, 362, one above and the other below the focal plane. In either case (if the scattering object is at the upper or lower nonfocal plane 361, 362), when the lens 130 is moved, the distance 403, 4031 can increase or decrease. If the focal plane 150 is where the laser beams 111, 112 meet at the optical axis 101, the lens movement that results in an increasing distance 403, 4031 can be reversed in order to reach focus.

In some embodiments, it is possible for the laser beams 111, 112 to have an offset at the focal plane 150, e.g rather than meeting at the optical axis 101. Such a situation may be due to imperfect optical alignment. For example, such an offset may be within an expected tolerance.

The device 100 can determine the distance, in the nonfocal plane 460, of the first nonfocal position 480 to the second nonfocal position 485. The autofocus device 100 is configured to determine a change of the nonfocal positions of the scattering source when the focusing lens 130 is moved, and to adjust the movement of the focusing lens based on the determined change.

In an embodiment having more than one laser beams 111, 112, the laser beams can be arranged spatially so that they are at 180° from each around the optical axis. Such an arrangement can allow for more sensitivity to the focus. When the beams 111, 112 are converging/diverging at 180°, the distance between the beams 111, 112 at the nonfocal plane is greater than for other arrangements (less than 180°). Sensitivity is desirable. When the beams 111, 112 are at 180° (e.g. at 12 o'clock and 6 o' cock), the problem of degenerate distances 403 can occur with two or more nonfocal positions 480, 485. The degeneracy problem can be dealt with as explained herein.

When the beam placement is less symmetric, the relative positions of the beams with respect to the optical axis can change such as to avoid the degeneracy problem. Two beams 111, 112 can be at 90° angular positions (e.g. 12 o-clock and 3 o'clock positions) as the beams 111, 112 pass through the lens 120. At nonfocal planes above the focal plane, the beams are at 12 and 3 o-clock. At nonfocal planes below the focal plane, the beams are at 6 and 9 o'clock. Other asymmetric beam placements are also possible.

Another possibility is to use laser beams 111, 112 that can be distinguished from each other. For example, the lasers can have different wavelengths. Alternatively/additionally, one or more of the beams can be modulated differently than the other.

The autofocus device 100 can repeatedly determine the nonfocal position(s) of the scattering source 188, such as to update the focus and/or reverse lens movement.

For example, a surgical microscope can use the autofocus device 100, and the surgical microscope can be flexibly positioned. Repositioning the microscope in x,y can result in loss of focus due to the variations in the object height. The autofocus can be triggered, for example, with movement of the image/field of view in the x,y plane.

The autofocus device and method can be operable in conditions in which the sample (e.g. the scattering source), at least locally, e.g. within the immediate field of view of the device and/or microscope, is oriented arbitrarily with respect to the optical axis. Herein, the autofocus device and method may operate in such a way that the scattering source is assumed to extend in a plane perpendicular to the optical axis.

Some embodiments relate to a microscope comprising a device as described in connection with one or more of the FIGS. 1-4 and 5-9. Alternatively, a microscope may be part of or connected to a system as described in connection with one or more of the FIGS. 1-4 and 5-9.

Figure 5:
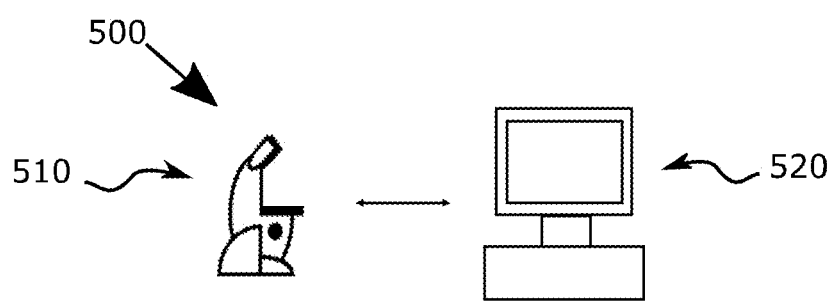
FIG. 5 illustrates a system including a microscope and computer system, according to embodiments described herein.

FIG. 5 shows a schematic illustration of a system 500 configured to perform a method described herein. The system 500 comprises a microscope 510, such as a surgical microscope (e.g. which may include the autofocus device 100) and a computer system 520. The microscope 510 is configured to take images and is connected to the computer system 520. The computer system 520 is configured to execute at least a part of a method described herein. The computer system 520 may be configured to execute a machine learning algorithm. The computer system 520 and microscope 510 may be separate entities but can also be integrated together in one common housing. The computer system 520 may be part of a central processing system of the microscope 510 and/or the computer system 520 may be part of a subcomponent of the microscope 510, such as a sensor, an actor, a camera or an illumination unit, etc. of the microscope 510.

Herein, the controller 170 may be part of the computer system 520 and vice versa. The computer system can collect images from the detector 120. The computer system 520 can determine the position of laser scatter from the image(s), e.g. for determining the nonfocal position of collected laser scatter.

A calibration may be stored (e.g. in computer memory) that enables the determination of nonfocal position of scattering source in the nonfocal plane from the position of the collected laser scatter in the detector 120. At least one calibration may be stored to determine z-distance and/or lens movement from the image data from the detector 120, e.g as described herein such as by using distances, vectors, and/or reference positions.

The computer system 520 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 520 may comprise any circuit or combination of circuits. In one embodiment, the computer system 520 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 520 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 520 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 520 may also include a display device, one or more speakers, and a keyboard and/or controller, which can include a mouse, trackball, touch screen, voice-recognition device, or any other device that permits a system user to input information into and receive information from the computer system 520.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

An embodiment of the present invention is a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Figure 6:
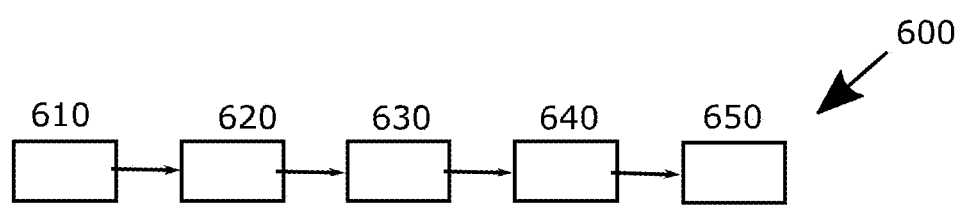
FIG. 6 illustrates a method of focusing a lens, according to embodiments described herein.

FIG. 6 illustrates a method of focusing a lens, according to an embodiment. The method 600 includes passing 610 a laser beam through a focusing lens, directing 620 the laser beam at a focal plane; collecting 630 laser scatter from a nonfocal position outside of the focal plane by a detector; determining 640 a nonfocal position of the scattering source from the collected laser scatter; and moving 650 the focusing lens based on the determined nonfocal position, such that the scattering source is at an origin of the focal plane. The method 600 of FIG. 6 is illustrative of the methods described with regard to the autofocus device 100 described herein, for example, as implemented in a surgical microscope.

Figure 7:
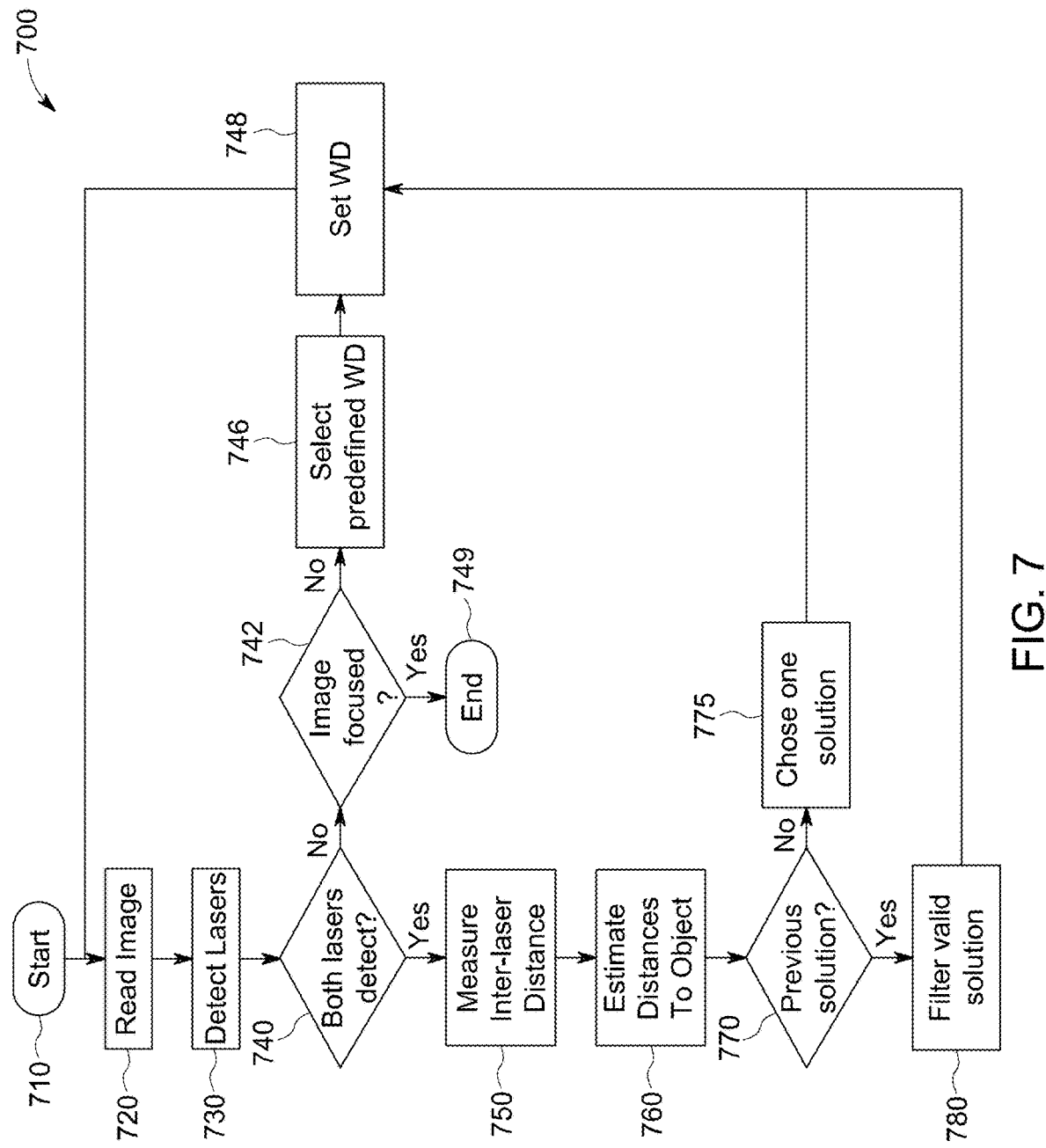
FIG. 7 illustrates a block diagram of a method of focusing a lens, according to embodiments described herein.

FIG. 7 illustrates a method of focusing a lens, according to an embodiment. The method 700 of FIG. 7 is illustrative of the methods described with regard to the autofocus device 100 described herein, for example, as implemented in a surgical microscope. The method 700 of FIG. 7 uses at least two laser beams 111, 112. The method 700 includes starting 710, reading an image 720 (e.g. with the detector 120), detecting lasers 730, and determining if two or more laser scatter signals are detected 740. When the lasers are not detected, there is a determination 742 of whether the image is in focus, such as when one laser scatter signal is detected, e.g. at optical axis. When the image is determined to be focused the method ends 749. The focus determination and end of the method 749 can also occur when the two laser scatter signals are within measurement error of their positions in the focal plane 150. Measurement error may take into account estimated sample roughness.

If the image is determined to not be in focus, such as if no laser is detected, a focal position and/or working distance is selected 746, e.g. from memory. The lens 120 can be moved to the selected focus position 748. Subsequently, the method returns to the step of reading an image 720.

If two or more laser scattering signals are detected 740, the method proceeds to determine the position(s) of the nonfocal positions 750. The distance and/or vector between the laser scattering signals and/or each signal and the optical axis can be determined at step 750. The determination at 750 is used to estimate the z-distance 760. It is determined 770 whether the z-distance corresponds to a previous solution. For example, the z-distance may have two solutions, particularly when the nonfocal positions determination has two degenerate solutions for z-distance. If none of the determinable z-distance solutions is determined 770 to have been a previous solution, then one is selected 775, and the method proceeds to move to the selected focus position 748, followed by reading another image at 720 . . . .

If, at step 770, one of the z-distances has been a previous solution, then a valid solution is selected 780. The valid solution for the z-distance (or absolute z-position) may be the previous solution, particularly in the case where the x,y position is a previously focused position. Alternatively, the valid solution for the z-distance may be a previously unselected degenerate solution which, upon movement of the lens, led to increasing rather than decreasing distance of the nonfocal position(s) of the detected latter scatter). Once the valid solution is selected 780, the method proceeds to move to the selected focus position 748, followed by reading another image at 720 . . . .

Figure 8:
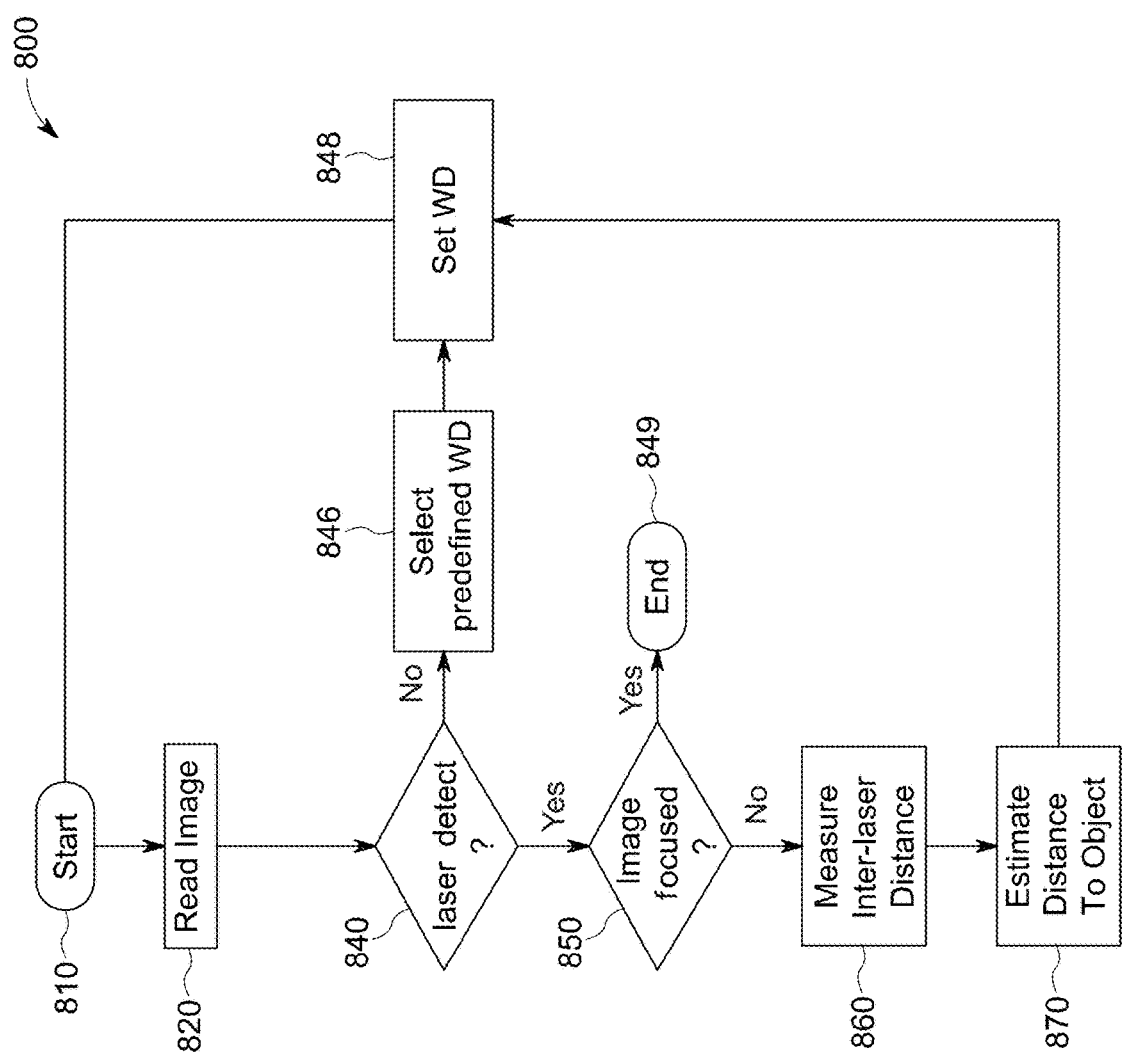
FIG. 8 illustrates a block diagram of a method of focusing a lens, according to embodiments described herein.

FIG. 8 illustrates a method of focusing a lens, according to an embodiment. The method 800 of FIG. 8 is illustrative of the methods described with regard to the autofocus device 100 described herein, for example, as implemented in a surgical microscope. The method 800 starts 810, and an image is read 820, and a determination 840 of whether laser scatter is detected is made. If no laser scatter is detected, the focal position and/or working distance is selected 846, e.g. from memory. The lens 120 can be moved to the selected focus position 848. Subsequently, the method returns to the step of reading an image 820.

If a laser scattering signal is detected 840, the method proceeds to determine 850 the position(s) of the scattered laser signal. If the image is focused, e.g. when the scattering signal is at the optical axis, the method ends 849 (e.g until the microscope is moved such that the start 810 may be triggered again).

If there is a determination 850 that the image is not in focus, a distance is determined 860, e.g. the distance between the position of the laser scatter and the optical axis. Alternatively/additionally, a vector between a position of detected laser scatter and a reference position is determined. The distance/vector determination 860 is used to determine 870 a z-distance. The z-distance determination is used to move 848 to the focus position (e.g set the lens position to the working distance), followed by reading another image at 820 . . . .

The distance and/or vector between the laser scattering signals and/or each signal and the optical axis can be determined at step 850. The determination at 850 is used to estimate the z-distance 860.

Figure 9:
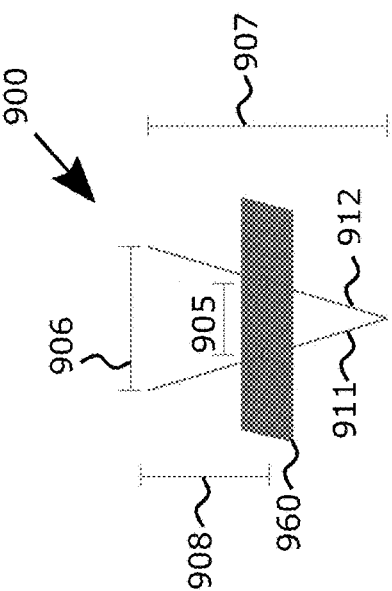
FIG. 9 illustrates a nonfocal plane, according to embodiments described herein.

FIG. 9 illustrates a nonfocal plane, according to an embodiment. FIG. 9 can illustrate alternative/additional features of the nonfocal planes described herein, such as with respect to other figures. FIG. 9 shows an inter-laser distance 905, e.g. between a first and second laser beams 911, 912 in a nonfocal plane 960. FIG. 9 also illustrates a baseline 906 which can be a fixed distance between the laser beams 911, 912 at or above a focusing lens. For example, when the baseline 906 and working distance 907 of the lens is known, and the inter-laser distance 905 is determined (e.g. by the controller 170 by analysis of the signal/data from the detector), the object distance 908 (e.g. the distance to the nonfocal plane 960) can be determined. The z-distance to move the focus can also be determined. In the equation below, WD stands for working distance (e.g from the front edge and/or front lens of the camera/microscope to the focal point).

$$\text{Object Distance} = WD - \text{Interlaser Distance} \frac{WD}{\text{Baseline}}$$

The WD may alternatively/additionally be regarded as the distance (e.g. between the sample and the microscope, camera, and/or front lens) to converge the lasers at the focal point.

When the object distance is determined, the lens can be moved by a z-distance so that the object distance (e.g. from the front edge and/or front lens of the camera/microscope to the scattering source) is the same as the WD. The object is in focus when it is at the working distance. Alternatively/additionally, the sample can be moved so that the object distance and working distance are equal. In yet another example, the working distance may be adjustable so that the working distance can be changed in order to match the distance to the object (for example, when using a variable focal length lens).

Herein, descriptions pertaining to the determination of a position of a scattering source 188 may utilize data from the image plane, e.g. information acquired by the detector at the detector plane. The image plane can provide information of the focal plane, nonfocal plane(s), and/or z-distance, e.g. in the form of positions of detected laser scatter, position of the optical axis, and/or combinations thereof.

Herein, the z-distance may refer to the distance between a nonfocal plane and a focal plane. The z-distance may have a directional component (the z-distance may include a z-direction and/or information as to direction). Alternatively/additionally, the z-distance may refer to the distance for the movable lens to move such that the focal plane moves a desired distance and/or direction, e.g to the position of a nonfocal plane, e.g one that includes a scattering source.

Herein, distances determined within planes perpendicular to the optical axis may include directional information. Direction information may be information relative to the origin at the detector plane, for example, e.g. a digital bit or bits to indicate direction information. Direction information may be used to determine the direction of the z-distance, e.g. to determine which of more than one nonfocal planes corresponds to the position of a scattering source, e.g. to address the degeneracy problem as described herein.

Herein, a determination about "nonfocal positions" and the optical axis can refer to the nonfocal positions in a nonfocal plane that is perpendicular to the optical axis. The nonfocal position may be used to determine a distance and/or difference from the nonfocal position to the point of the nonfocal plane that is intersected by the optical axis, e.g. to determine a distance that may include direction information, e.g. in order to determine z-distance, e.g. the lens movement to reach focus.

Herein focusing by lens movement can be alternatively accomplished by movement of a sample.

The examples disclosed hereinabove are illustrative and not intended to be limiting. Reference numerals are given to aid in the understanding of the invention, and are for illustrative purposes, and not intended to be limiting. The invention is defined by the appended claims and their equivalents. A list of reference signs is provided for convenience and is not intended to be limiting.

LIST OF REFERENCE SIGNS

| | |
|---|---|
| autofocus device | 100 |
| optical axis | 101 |
| z-distance | 102 |
| laser beam | 111 |
| second laser beam | 112 |
| collected laser scatter | 119 |
| detector | 120 |
| detector optics | 125 |
| focusing lens | 130 |
| beamsplitter | 140 |
| focal plane | 150 |
| nonfocal plane | 160 |
| controller170 | 170 |
| nonfocal position | 180 |
| scattering source | 188 |
| origin | 190 |
| optical axis | 201 |
| distance | 203 |
| nonfocal plane | 260 |
| nonfocal plane | 261 |
| nonfocal position | 280 |
| nonfocal position | 281 |
| point | 290 |
| point | 291 |
| optical axis | 301 |
| arrow | 302 |
| arrow | 303 |
| laser beam | 310 |
| focal plane | 350 |
| first focal plane | 361 |
| second focal plane | 362 |
| angular position 1 | 371 |
| angular position 2 | 372 |
| first intersection point | 381 |
| second intersection point | 382 |
| origin | 390 |
| optical axis | 401 |
| distance | 403 |
| nonfocal plane | 460 |
| detector plane | 461 |
| first nonfocal position | 480 |
| first nonfocal position | 481 |

-continued

| | |
|---|---|
| second nonfocal position | 485 |
| second nonfocal position | 486 |
| system | 500 |
| microscope | 510 |
| computer system | 520 |
| method of focusing | 600 |
| passing beam | 610 |
| directing beam | 620 |
| collecting scatter | 630 |
| determining position | 640 |
| moving lens | 650 |
| method of focusing | 700 |
| starting | 710 |
| reading image | 720 |
| detecting lasers | 730 |
| determining scatter | 740 |
| determining focus | 742 |
| selecting focus | 746 |
| moving les | 748 |
| ending | 749 |
| detecing scatter | 750 |
| estimate z-distance | 760 |
| determine previous solutions | 770 |
| select solution | 775 |
| select solution | 780 |
| method of focusing | 800 |
| starting | 810 |
| reading image | 820 |
| determine scatter | 840 |
| select focal position | 846 |
| move to focus selection | 848 |
| ending | 849 |
| determine not in focus | 850 |
| determine distance | 860 |
| determine z-distance | 870 |
| nonfocal plane | 900 |
| distance | 905 |
| baseline | 906 |
| working distance | 907 |
| object distance | 908 |
| first beam | 911 |
| second beam | 912 |
| nonfocal plane | 960 |
| distance | 2031 |
| distance | 4031 |
| distance | 303a |
| second distance | 303b |
| first laser scatter | 419a |
| second laser scatter | 419b |

The invention claimed is:

1. An autofocus device, comprising
a focusing lens which is movable;
a laser module configured to radiate a first laser beam and a second laser beam through the focusing lens toward a focal plane;
a detector configured to collect a first laser scatter of the first laser beam from a first non-focal position outside of the focal plane and a second laser scatter of the second laser beam from a second non-focal position outside of the focal plane; and
a controller configured to determine, from the collected first laser scatter, the first non-focal position of a scattering source and the second non-focal position of the scattering source from the collected second laser scatter, and move the focusing lens, based on the determined first non-focal position and the determined second non-focal position, such that the scattering source is at an origin of the focal plane,
wherein the first laser beam and the second laser beam are arranged asymmetrically from each other around an optical axis of the focusing lens.

2. The autofocus device of claim 1, wherein
the autofocus device is configured to determine the non-focal position by determining a distance of the scattering source, in a non-focal plane parallel to the focal plane, from an optical axis which passes through the non-focal plane and the focal plane.

3. The autofocus device of any claim 2, wherein
the autofocus device is configured to move the focusing lens by a z-distance determined based on the origin of the focal plane and the non-focal position of the scattering source.

4. The autofocus device of claim 1, wherein
the first and second laser beams are configured to be directed at the origin of the focal plane.

5. The autofocus device of claim 1, wherein
the first and second laser beams are distinguishable from each other.

6. The autofocus device of claim 1,
wherein the detector is an array detector.

7. The autofocus device of claim 1, wherein
the origin is a focal point of at least one of the autofocus device or a microscope which is coupled to the autofocus device.

8. The autofocus device of claim 1, wherein
the autofocus device is configured to determine a change of the non-focal position of the scattering source when the focusing lens is moved, and to adjust a movement of the focusing lens based on the determined change.

9. A surgical microscope, comprising:
the autofocus device of claim 1; wherein
the laser beam is configured to converge at the focal plane at a working distance of the microscope.

10. A method of focusing a focusing lens, comprising:
passing a first laser beam and a second laser beam through a focusing lens,
directing the first laser beam and the second laser beam at a focal plane;
collecting a first laser scatter of the first laser beam and a second laser scatter of the second laser beam from a non-focal position outside of the focal plane by a detector;
determining a first non-focal position of the scattering source from the collected first laser scatter and a second non-focal position of the scattering source from the collected second laser scatter; and
moving the focusing lens based on the determined first non-focal position and the determined second non-focal position, such that the scattering source is at an origin of the focal plane,
wherein the first laser beam and the second laser beam are arranged asymmetrically from each other around an optical axis of the focusing lens.

11. A non-transitory computer-readable medium comprising a computer program comprising instructions to focus a lens according to the method of claim 10.

* * * * *